United States Patent
Thakur et al.

(10) Patent No.: US 9,661,010 B2
(45) Date of Patent: May 23, 2017

(54) SECURITY LOG MINING DEVICES, METHODS, AND SYSTEMS

(71) Applicant: Honeywell International Inc., Morristown, NJ (US)

(72) Inventors: Kushagra Thakur, Patna (IN); Chinmaya Kar, Bangalore (IN); Chandrakantha Reddy, Kurnool District (IN); Mohammed Ibrahim Mohideen, Bangalore (IN); Magesh Lingan, Thuneri (IN); Adam Gibson, Sunnybank (AU)

(73) Assignee: Honeywell International Inc., Morris Plains, NJ (US)

( * ) Notice: Subject to any disclaimer, the term of this patent is extended or adjusted under 35 U.S.C. 154(b) by 218 days.

(21) Appl. No.: 14/550,059

(22) Filed: Nov. 21, 2014

(65) Prior Publication Data
US 2016/0149941 A1 May 26, 2016

(51) Int. Cl.
*H04L 29/00* (2006.01)
*H04L 29/06* (2006.01)
*G06F 17/30* (2006.01)
*G06F 21/55* (2013.01)

(52) U.S. Cl.
CPC .... *H04L 63/1425* (2013.01); *G06F 17/30539* (2013.01); *G06F 21/552* (2013.01)

(58) Field of Classification Search
CPC ................................. G05B 13/02; G06F 3/041
USPC ........................................................ 726/23
See application file for complete search history.

(56) References Cited

U.S. PATENT DOCUMENTS

| 7,796,029 B2 | 9/2010 | Ma et al. |
|---|---|---|
| 8,396,741 B2 | 3/2013 | Kannan et al. |
| 2009/0210081 A1* | 8/2009 | Sustaeta ............. G05B 13/0285 700/99 |
| 2011/0181414 A1 | 7/2011 | G et al. |

FOREIGN PATENT DOCUMENTS

WO   2013118144   8/2013

OTHER PUBLICATIONS

Thuraisingham, "Data Mining for Counter-Terrorism". pp. 191-218. Date Accessed: Dec. 30, 2013. http://www.utdallas.edu/~jxr061100/paper-for-website/%5B18%5DMining-Terrorism-NGDM04.pdf.

* cited by examiner

*Primary Examiner* — Anthony Brown
*Assistant Examiner* — Michael D Anderson
(74) *Attorney, Agent, or Firm* — Brooks, Cameron & Huebsch, PLLC (57) ABSTRACT

Devices, methods, and systems for security log mining are described herein. One method includes combining, using a data fusion unit of an access control system, features of structured and non-structured data associated with system access events for a number of users into a combined data set, generating, using an anomaly detection engine of the access control system, a model of behavior for the number of users based on the combined data set, and comparing, using the anomaly detection engine of the access control system, real time behavior for the number of users to the model for the number of users to determine whether the real time behavior for the number of users is anomalous behavior for the number of users.

20 Claims, 4 Drawing Sheets

SECURITY LOG MINING DEVICES, METHODS, AND SYSTEMS

TECHNICAL FIELD

The present disclosure relates to methods, devices, and systems for security log mining.

BACKGROUND

Businesses may utilize physical and logical security systems to ensure that their physical property and data are secure. This can be especially concerning for businesses that deal with financial information. For example, keeping information (e.g., financial information) secure may be a big priority for businesses that provide financial services to customers.

Businesses may keep information secure by utilizing physical security systems to protect the hardware and/or physical files that include the information. Physical security systems can include video cameras to capture video of particular areas. In addition, many physical security systems can include key fobs or other electronic devices to control access to particular areas.

Businesses may also keep information secure by utilizing computing security such as network security. The computing security can include user name/password security among other computing security systems to prevent unauthorized users from accessing the computing system.

DETAILED DESCRIPTION

Security log mining devices, methods, and systems are described herein. For example, one or more embodiments include a method that includes combining, using a data fusion unit of an access control system, features of structured and non-structured data associated with system access events for a number of users into a combined data set, generating, using an anomaly detection engine of the access control system, a model of behavior for the number of users based on the combined data set, and comparing, using the anomaly detection engine of the access control system, real time behavior for the number of users to the model for the number of users to determine whether the real time behavior for the number of users is anomalous behavior for the number of users.

Combining the structured (e.g., event logs, etc.) and non-structured data (e.g., video logs, etc.) into a combined data set and analyzing the combined data set in accordance with the present disclosure can be utilized to detect anomalous employee behavior. The anomalous employee behavior can include anomalous computing behavior and/or anomalous physical behavior. For example, anomalous computing behavior can include anomalous log in times. In another example, anomalous physical behavior can include anomalous access times to a physical location.

The combined data set can be utilized to generate a model for each of the number of users and/or a group (e.g., subset) of the number of users. The model can include a model developed using mathematical modeling techniques such as logistic regression based on the structured and non-structured data. The model can also include a range of values that are acceptable and a range of values that are considered anomalous behavior. The model can then be utilized at run time to compare received behavior from each of the number of users to determine accepted and anomalous behaviors of each of the number of users. When an anomalous behavior is determined from the comparison of the model to the real time data a notification can be sent and/or displayed by a computing device.

In some embodiments, the model can be generated during offline batch processing and utilized during run time to reduce needed computing resources compared to previous embodiments. In addition, generating the model as described herein provides a more comprehensive representation of user behavior and enables more accurate anomalous behavior detection compared to previous methods.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of users" can refer to one or more users. Additionally, the designator "N", as used herein, particularly with respect to reference numerals in the drawings, indicates that a number of the particular feature so designated can be included with a number of embodiments of the present disclosure.

Figure 1:
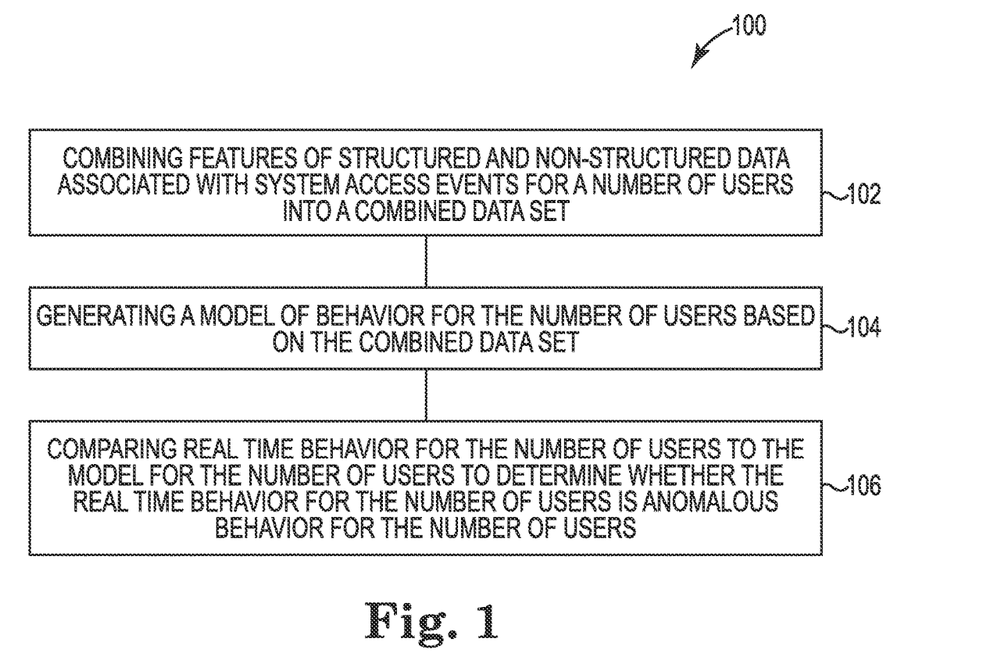
FIG. 1 is an example of a method for security log mining according to one or more embodiments of the present disclosure.

FIG. 1 is an example of a method 100 for security log mining according to one or more embodiments of the present disclosure. The method 100 can be executed by a computing device as described herein. The method 100 can be utilized for security log mining to combine structured and non-structured data associated with system access events for a number of users and utilize the combined data set to generate a model of user behavior. The model can be utilized for comparing real time behavior of the number of users. Comparing the real time behavior to the model can be utilized to identify anomalous behavior of the number of users.

At block 102 the method 100 can include combining features of structured and non-structured data associated with system access events for a number of users into a combined data set. As used herein, structured data includes data that resides in a fixed field within a record or file. The structured data can be contained in relational databases and/or spreadsheets. In some embodiments, the structured data associated with system access events can include, but is not limited to: log in times, log out times, location of log in, and/or security logs, among other data that is structured within the record or file of an event (e.g., log in, log off, etc.).

As used herein, non-structured data includes data that is not in a fixed field within a record or file. The non-structured data can be contained in a database. The non-structured data can include, but is not limited to video logs, historical incident data, and/or user profile data, among other data that is not structured within the record or file of an event (e.g., accessing an area, etc.).

The structured data and non-structured data can be combined by separating received data into structured data and non-structured data. When the structured and non-structured are separated each can be processed and combined as described herein. Processing and combining the structured and non-structured data can include extracting a number of features of the structured and non-structured data (e.g., features associated with access events) and categorizing the number of features. The number of features can include a particular data type (e.g., log in data, video data, log out data, access data, system usage data, etc.). That is, processing and combining the structured and non-structured data can include extracting particular data types and categorizing the particular data types. In some embodiments, processing and combining the structured and non-structured data can include providing a membership function to the structured and non-structured data using expert opinions and/or weighting the structured and non-structured data based on historical behavior. As used herein the membership function can include a part of a "fuzzy set" that is a generalization of an indicator function in a "classical set". That is, the membership function can represent a "degree of truth" as an extension of valuation.

In some embodiments, categorizing the particular data types can include categorizing the particular data types based on an identified user associated with the particular data type. For example, the data type can include log in data to a particular computing system. In this example, the log in data can be categorized based on an identified user that performed the log in of the computing system. In some embodiments, the data types can be categorized for a group or plurality of users. That is, data types that are associated with a particular user and/or a plurality of users can be placed in the same category corresponding to the particular user and/or plurality of users.

In some embodiments, processing and combining the structured and non-structured data can include extracting particular portions (e.g., features) of the structured and/or non-structured data. For example, a user identification, a time stamp, and/or a location of computing device can be extracted from the log in data. In this example, the extracted data can be combined with other extracted data from structured and/or non-structured data for the same user and/or plurality of users. The extracted data can be utilized to generate a model of behavior for the user and/or plurality of users.

At block 104 the method 100 can include generating a model of behavior for the number of users based on the combined data set. As described herein, the combined data set can include extracted data from data types that are associated with the number of users.

The extracted data from the data types can be utilized to generate a model of the data types associated with the number of users. In some embodiments, data can be extracted that is associated with a particular user and a particular user behavior. For example, log in data that is associated with a particular user can be extracted from a plurality of log in data. In this example, a user identification of the user, a time stamp of the log in, and a location of the system utilized to perform the log in can be extracted to generate a model of log in behavior of the user.

The model that is generated from the combined data set can include a model developed using mathematical modeling techniques such as regression or logistic regression of the combined data set. The regression model can be based on the combined data set and represent a range of values that are determined to be acceptable values. The linear regression model can be utilized to identify anomalous behavior of a user or group of users based on received data that corresponds to the user or group of users.

At block 106 the method 100 can include comparing real time behavior for the number of users to the model for the number of users to determine whether the real time behavior for the number of users is anomalous behavior for the number of users. Classifying real time behavior can include receiving data in real time and passing the features extracted from the real time data to the model. Classifying the real time behavior can include adding a point to the model and determining if the point is within the range of acceptable values or if the point is an outlier value that outside the range of acceptable values. If the point is an outlier value that is outside the range of acceptable values it can be determined that the real time behavior that corresponds to the point is anomalous user behavior.

In some embodiments, comparing real time behavior can include classifying the real time behavior (e.g., real time extracted features, etc.). Classifying the real time behavior can include assigning a particular real time behavior into a normal class (e.g., normal category) or into an abnormal class (e.g., abnormal category). The classifications can be done with a certain confidence level. In some embodiments, classifying the real time behavior can be utilized when the model is developed using a classification mathematical function such as logistic regression.

In some embodiments, the method 100 can include generating the model utilizing offline batch processing via a computing device as described herein. In these embodiments, the method 100 can include comparing, during real time, the generated model to behaviors and/or events of the number of users. That is, there is a combination of real time behavior comparisons and offline batch processing to generate the model.

The method 100 can include extracting profile data for the number of users and combining the profile data for the number of users with corresponding data from the combined data set. The profile data can include human resource (HR) profile data for the number of users. The profile data can include, but is not limited to: user name, user position, user access restrictions, physical location of the user, and/or user credentials among other profile data information that corresponds to the number of users. The profile data can be utilized to determine the acceptable range of the generated model. For example, the physical location of the user can be utilized to determine an acceptable range of access to a particular physical location of hardware. In some embodiments, the acceptable range may include both acceptable behavior values and anomalous behavior values.

The method 100 (e.g., combining the structured and non-structured data) can include quantifying subjective data from the structured and non-structured data and combining the structured and non-structured data based on a number of rules. Quantifying subjective data from the structured and non-structured data can include assigning a value and/or a key value to each event of a user. The value and/or key value can be assigned based on a number of predefined rules. In addition, as described herein, the structured and non-structured data can be combined based on a number of rules and/or data fusion rules.

In some embodiments, the number of rules can include assigning a weight to each event and/or value. The weight can include a value that represents an importance and/or a relevance for the corresponding event and/or value. In some embodiments, the method 100 (e.g., combining the structured and non-structured data) can include determining a weighted value for the structured and non-structured data and combining the structured and non-structured data based on the determined weighted values. The weighted value can be determined based on a relative location of a real time event to the generated model. In some embodiments, a user can input a desired weight to each event and/or value. In certain embodiments, the user can input a desired weight to a category of events and/or values.

In some embodiments, a greater weight can be assigned to features of an event that more closely corresponds to the event. For example, weights can be assigned to features of video logs that correspond to an access event (e.g., RFID access to a particular area). In this example, video log data can be assigned a weight value based on how close the video log data is to the access event. That is, a video log from a relatively close location to the access event can be assigned a relatively greater weight value compared to a video log from a relatively distant location because the video log from the relatively close location is more relevant. The method 100 can be advantageous over previous methods and systems by combining structured and non-structured data into a combined data structure that can be utilized to generate a model of behavior for the number of users. In addition, the structured and non-structured data can include physical log data that is received from the number of users and logical log data that is received from the number of users. By utilizing physical data and logical data into a combined data set, the model generated based on the combined data set can give a better representation of user behavior with relatively less collected data compared to previous methods and systems.

Figure 2:
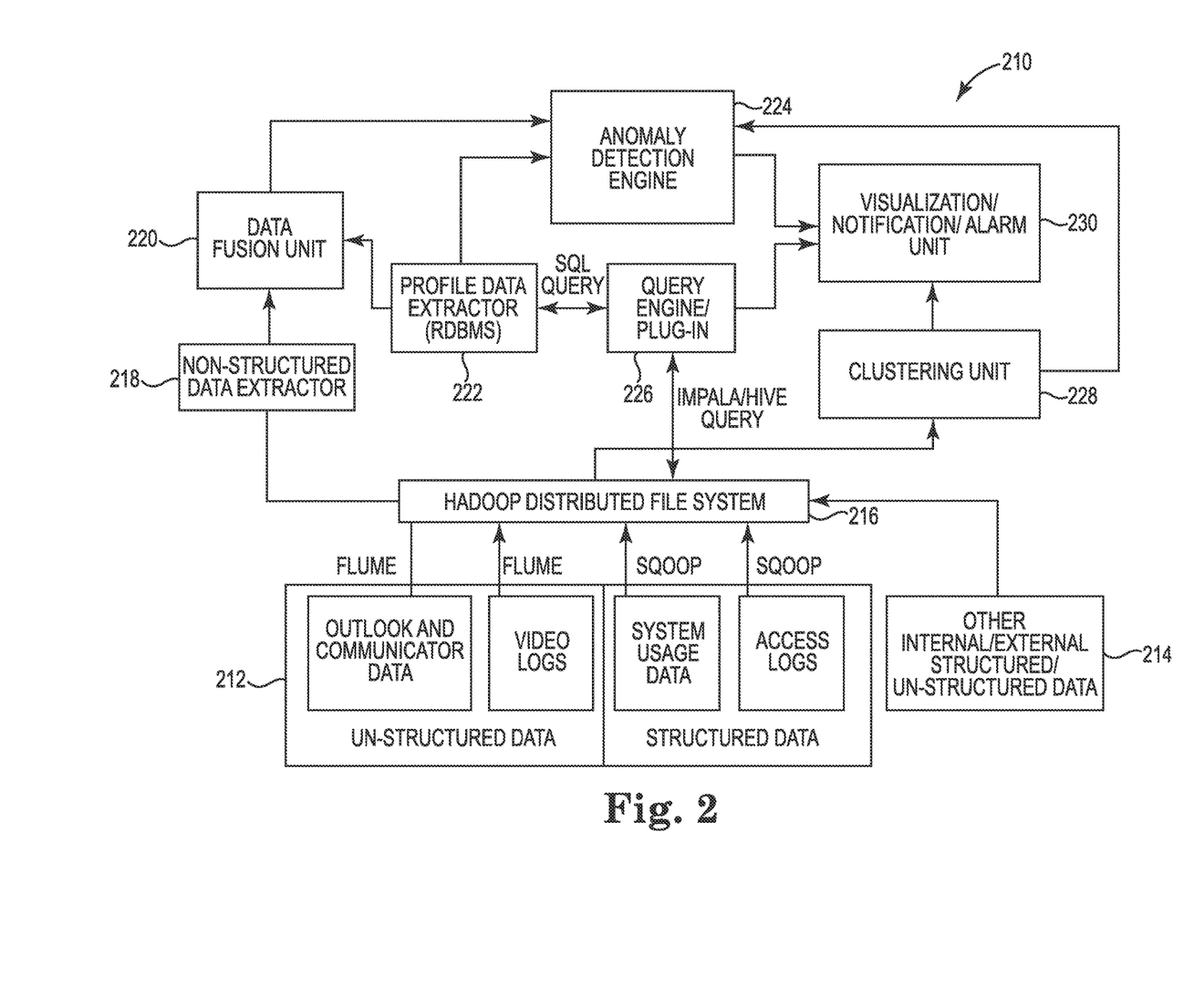
FIG. 2 is an example of a system for security log mining according to one or more embodiments of the present disclosure.

FIG. 2 is an example of an access control system 210 for security log mining according to one or more embodiments of the present disclosure. The system 210 can be utilized to perform the method 100 as referenced in FIG. 1. In some embodiments, the system 210 can utilize a computing device as described herein to perform the functions described herein.

The system 210 can include data 212. The data 212 can include access data for a number of users. As described herein, the access data can include access data to physical locations and/or physical hardware of a system. The data 212 can also include access data for computing systems (e.g., logical data). As described herein, the access data for computing systems can include, but is not limited to: log in times, log out times, location of log in, and/or security logs of the computing system.

In some embodiments, the system 210 can separate and/or categorize the data 212 into structured data and non-structured data. The structured data can include, but is not limited to: system usage data and/or access logs of a system, among other data that is structured as described herein. The non-structured data can include, but is not limited to: video log data and/or data associated with a communication system (e.g., Outlook®, email, text data, etc.).

In some embodiments, the system 210 can include data 214 that can be utilized by the system 210. The data 214 can include internal or external data associated with the number of users. The data 214 can include structured data or non-structured data as described herein. The data 214 can include data such as HR profile data that can be utilized as described herein. In some embodiments, the HR profile data can include social media data. For example, the HR profile data can include status updates on a social media site. In another example, the HR profile data can include a "tweet" from the social media site Twitter®. The social media data can also include information about events that an employee might be attending.

The data 212 and 214 can be received from a number of databases (not shown in FIG. 2) associated with system access events. For example, the structured data can be received from a first database, and the non-structured data may be received from a second database. In some embodiments, the data 214 can include historical data of the number of users. In certain embodiments, generating the model can include generating the model based at least in part on historical data for each of the number of users. As used herein, the historical data of the number of users can include historical event data for a number of users.

The data 212 and 214 can be received at a file system 216. The file system 216 can be a distributed file system that determines access capabilities for a number of users. In some embodiments, the file system 216 can include different access capabilities and/or restrictions for each of the number of users. For example, a first user can have access capabilities to view and/or edit particular files from the file system 216 and a second user can have different access capabilities to view and/or edit different files from the file system 216.

The non-structured data from the data 212 can be sent to a non-structured data extractor 218. The non-structured data extractor 218 can extract data from the non-structured data associated with a particular user and/or particular number of users. The non-structured data extractor 218 can extract data that was created by an event initiated by the user. For example, the non-structured data extractor 218 can extract data from a physical access event that was initiated by the user. In this example, the non-structured data extractor 218 can extract data such as: location of physical access event, video log data, video of physical access event, identification of user initiating the access event, identification of key card used for the physical access event, among other data that can be extracted from the non-structured data. The extracted data from the non-structured data extractor 218 can be sent to a data fusion unit 220.

The structured and extracted data from the non-structured data can be combined at the data fusion unit 220. The data fusion unit 220 can combine the structured and extracted data from the non-structured data into a combined data set. The combined data set can include the structured data and extracted data from the non-structured data that corresponds to a particular user and/or a particular group of users. That is, a separate combined data set can be generated for each of a plurality of different users and/or for each of a number of groups that each comprises a plurality of users.

The data fusion unit 220 can receive profile data (e.g., HR profile data, etc.) from a profile data extractor 222. The profile data extractor 222 can extract profile data for the number of users. The profile data extractor 222 can extract profile data from an internal database and/or an external database (not shown in FIG. 2) that includes profile data of the number of users. The profile data from the profile data extractor 222 can be fused with the corresponding structured data and extracted data from the non-structured for the number of users. For example, the data fusion unit 220 can fuse the profile data for a user, the structured data for the user, and/or the extracted data from the non-structured data into a combined data set that corresponds to the user. In some embodiments, the data fusion unit 220 can utilize a number of different fusion techniques. For example, the data fusion unit 220 can utilize Fuzzy Fusion and/or Dempster Shafer Fusion techniques to fuse features of from the structured data and the non-structured data into a combined data set.

The data fusion unit 220 can interpolate (e.g., quantify) the received structured data and non-structured data in order to reduce a quantity of data to be processed. In some embodiments, the data fusion unit 220 can combine features of the received structured data and non-structured data. In some embodiments, the data fusion unit 220 can combine historical structured data, historical non-structured data, run time structured data, and/or run time non-structured data into a combined data set. The run time structured data and run time non-structured data can include present data received by the data fusion unit 220. In some embodiments, the data fusion unit 220 can utilize a Bayesian fusion technique to combine the received historical data with the received run time data.

The data fusion unit 220 can utilize features (e.g., unique characteristics, etc.) of the received structured and non-structured data to combine the data into the combined data set. For example, the access log data, video data, and/or IT logs can include unique characteristics that can be utilized to customize the combined data set for a particular user case.

The data fusion unit 220 can be utilized to quantify and/or interpolate the unstructured and structured data. In some embodiments, the unstructured data may not be continuous data. That is, there can be data that is representative of particular portions of time over a particular time period. In addition, the unstructured data can be subjective data. That is, there can be data that includes subjective information to be analyzed and quantified into objective data. For example, the subjective data can include images of people from video logs. In this example, the images of the people can be analyzed to determine an identity of the people and quantified into objective data with the identity of the people.

In some embodiments, the data fusion unit 220 can receive user defined information for customizing the fusion of the structured data and non-structured data. The user defined information can include: weighting information to be assigned to features of the structured and non-structured data, a number of rules for integrating the received structured and non-structured data, quantification information relating to subjective data associated with the received structured and non-structured data, and/or threshold information, among other user defined information.

The weighting information can include a weight value assigned to each of a plurality of features from the received structured and non-structured data. The weight value can designate a priority of the features of the structured and non-structured data.

In some embodiments, the data fusion unit 220 can determine a failure and/or or an inadequacy of the structured and/or non-structured data set. In some embodiments, the data fusion unit 220 can determine a failure or inadequacy by comparing the structured and/or non-structured data sets with redundant information corresponding to the structured and/or non-structured data sets. For example, the structured and/or non-structured data sets can include redundant data bases storing redundant data for the structured and non-structured data sets that can be utilized to determine if there are failures or inadequacies within the structured or non-structured data.

As described herein, the data fusion unit 220 can utilize a number of different data fusion techniques. For example, the data fusion unit can utilize a fuzzy fusion technique. The fuzzy fusion technique can include quantifying subjective data from the structured and/or non-structured data. In some embodiments user defined data can be incorporated to quantify the subjective data as described herein. In some embodiments, the fuzzy fusion technique can include utilizing user defined thresholds assigned to features of the structured and/or non-structured data. In some embodiments, the fuzzy fusion technique can also include a number of user defined "fuzzy" rules to define how the structured and non-structured data is combined into a combined data set. In some embodiments, the data fusion unit 220 can utilize a Dempster Shafer fusion technique. The Dempster Shafer fusion technique can include assigning a weighting value to each of the number of features from the structured and non-structured data. The weighting values can designate a priority for particular features and provide guidance when combining the structured and non-structured data. In some embodiments, the data fusion unit 220 can utilize a Bayesian fusion technique by incorporating historical data that is collected to determine a number of previous probabilities and a number of joint probabilities for the structured and non-structured data.

The data fusion unit 220 can execute the number of fusion techniques at a number of different times and/or stages. In some embodiments, the data fusion unit 220 can combine the structured and non-structured data prior to generating a model of user behavior. For example, the structured and non-structured data can be combined utilizing a number of associated weights assigned to a number of features of the structured and non-structured data via a Dempster Shafer fusing technique as described herein. The model (e.g., mathematical model) can be generated based on the combined data set when the structured and non-structured data is combined utilizing the associated weights.

In some embodiments, the data fusion unit 220 can combine real time data that is received based on a mathematical behavior model. For example, a model can be utilized to determine if received real time data is normal behavior or abnormal behavior. In this example, the received real time data can be combined with other structured and non-structured data based on the determination of whether the received real time data is normal or abnormal behavior. That is, the real time data can be utilized to determine normal behavior and/or abnormal behavior for a number of users as well as updating the mathematical behavior model by combining the real time data to the combined data set. Updating the mathematical behavior model with real time data can provide a mathematical behavior model that represents recent behavior for a user and/or group of users.

The combined data set from the data fusion unit 220 can be sent to an anomaly detection engine 224. The anomaly detection engine 224 can be utilized to generate a model of user behavior for each of the number of users based on the combined data set. For example, the detection engine 224 can generate a separate model of user behavior that includes key value pairs for each respective user. That is, the anomaly detection engine 224 can generate the model by reducing the combined data set into a number of key value pairs that correspond to each of the number of users. Examples of key value pairs will be further described herein. In some embodiments, combining the structured and non-structured data includes instructions to combine, via offline batch processing, key value pairs that correspond to each of the number of users.

In some embodiments, the anomaly detection engine 224 can generate a model of user behavior by generating a model developed using mathematical modeling techniques such as logistic regression for each of the extracted number of features, particular data type and/or particular behavior event. In some embodiments, the anomaly detection engine 224 can generate a model of user behavior by generating a multi-dimensional Gaussian model.

In one example of generating a model of user behavior, the particular data type and/or particular behavior event can include, but is not limited to log in and log out activity. In this example, the particular data type and/or particular behavior can include data that is associated with the log in and log out activity of a particular user and/or group of users. The data that is associated with the log in and log out activity of the number of users can include the log in times of the number of users captured by a computing device, the log out times of the number of users captured by the computing device, video surveillance of the computing device at the log in times and/or log out times, physical access times of the number of users entering a location of the computing device, among other data that relates to the log in times and/or log out times of the computing device.

In some embodiments, the video log can be utilized to determine an identity of a user when an abnormal event is determined. For example, an access event can be determined to be an abnormal event for a particular user or a particular group of users. In this example, video log data associated with the access event can be utilized to determine an identity of a user that has initiated the access event. In this example, the video log data associated with the access event can be determined by the physical location of the access event and/or the time of the access event.

The detection engine 224 can utilize the generated model in real time to detect anomalous behavior of the number of users. For example, a mathematical model generated by the detection engine 224 can include a range of acceptable values (e.g., common log in times, common log out times, common access times, common locations, etc.) and/or a range of anomalous values (e.g., uncommon log in times, uncommon log out times, uncommon access times, uncommon locations, etc.) for the number of users. In this example, the detection engine 224 can receive real time data from a number of sources such as: the computing device where the log in and/or log out event are being executed, an access card reader to access a location of the computing device, a video surveillance camera that is located at or near the computing device, HR profile data updates of the number of users, among other real time data of the behavior for the number of users.

The detection engine 224 can send a notification to the notification unit 230 when an anomalous behavior of the number of users is detected. For example, a particular user can have a corresponding model with a range of acceptable values and/or a range of anomalous values. When a received value, such as a received log in time, is received by the detection engine 224, the received value can be compared to the generated model for the corresponding user. If the received value is within the range of anomalous values, the detection engine 224 can send a notification to the notification unit 230 with the received value and/or data that was received.

The notification unit 230 can send out notifications to a number of users, such as a manager or security personnel. The notification to the number of users can include, but is not limited to: a user profile of the user that performed the behavior that is determined to anomalous, the received data that is determined to anomalous, an explanation of why the data was determined to be anomalous, among other data that relates to why the data was determined to be anomalous. For example, the anomalous behavior can include an anomalous log in time at a particular computing device. The log in time can be determined to be anomalous for a number of reasons. For example, the log in time at the particular computing device can be a computing device that is located in an area where the user did not properly access the area. That is, the user may not have used an assigned access card to enter the area. In another example, the log in time can be determined to be anomalous when the time of the log in is not within an acceptable range of times for normal behavior for the particular user.

In some embodiments, the system 210 can include a query engine 226. The query engine can query the file system 216 for particular data associated with a particular user and/or particular event data as described herein. The query engine 226 can be utilized by the profile data extractor 222 to obtain profile data of the number of users. The query engine 226 can also be utilized by the notification unit 230 to obtain further information regarding a user that is suspected of anomalous behavior.

In some embodiments, the system 210 can include a clustering unit 228. The clustering unit 228 can be utilized to cluster a number of users into a number of categories based on the behavior of the number of users. In some embodiments, the clustering unit 228 can be utilized to cluster the number of users into a category of normal behavior and a category of anomalous behavior. The cluster unit 228 can notify the notification unit 230 that a portion of the number of users do not behave in a similar manner to a particular generated model and can produce false anomalous behavior determinations. For example, a portion of the number of users may travel to different time zones on a relatively regular basis. In this example, the portion of users can be categorized into the category of anomalous behavior. That is, when the portion of users are determined to be performing anomalous behavior due to a log in time or a log out time, the notification unit 230 can be notified by the clustering unit 228 to not send a notification that the portion of users are performing anomalous behavior.

In some embodiments, the number of categories can be utilized by the anomaly detection engine 224. For example, the anomaly detection engine 224 can utilize the number of categories to determine anomalous behavior for each of the number of categories. That is, the number of categories can be utilized to generate a model for each of the number of categories and utilize real time data to determine anomalous behavior for users within each of the number of categories.

The system 210 can be advantageous over previous systems and methods by combining structured data, non-structured data, and/or profile data into a combined data set that corresponds to a number of users. The combined data set that corresponds to the number of users can be utilized to generate a behavior model as described herein and utilized to detect anomalous user behaviors in real time by comparing the real time data for the number of users to the generated behavior model for the number of users. The system 210 can also save computing resources by generating the model off line and utilizing the model during run time. The system 210 can also cluster the number of users and remove false positive anomalous behavior determinations. Thus, the system 210 provides a more accurate and less computing intensive system for determining anomalous behavior for the number of users.

Figure 3:
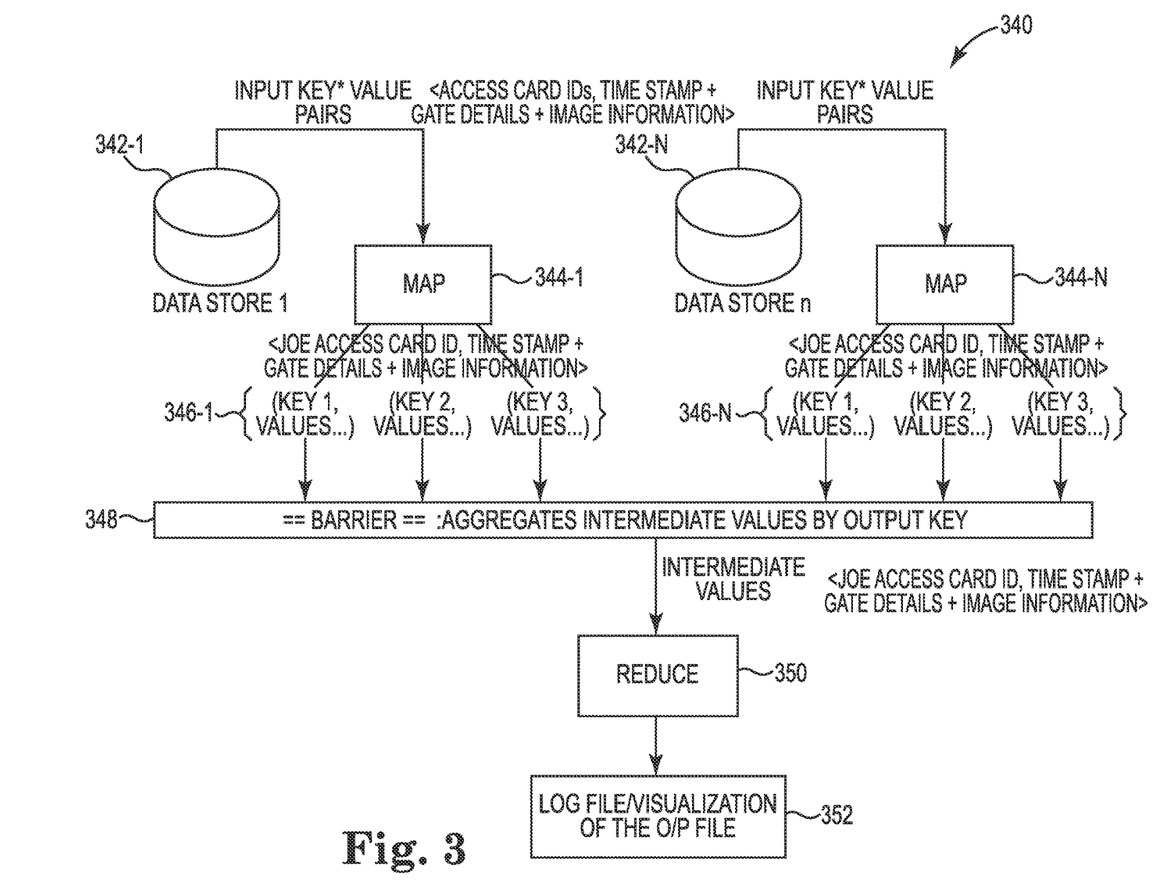
FIG. 3 is an example of a system for security log mining according to one or more embodiments of the present disclosure.

FIG. 3 is an example of a system 340 for security log mining according to one or more embodiments of the present disclosure. The system 340 can be a system for mapping and reducing data from a number of databases 342-1, 342-N. The number of databases 342-1, 342-N can include event data associated with the number of users. As described herein, the event data can include data associated with system access events. The data associated with system access events can include, but are not limited to: log in times, log out times, location of log in, and/or security logs, among other data that is structured within the record or file of an event (e.g., log in, log off, etc.).

The data from the databases 342-1, 342-N can be mapped by a mapper 344-1, 344-N. The mapper 344-1, 344-2 can identify data from the databases 342-1, 342-N as structured data or non-structured data as described herein. The mapper 344-1, 344-N can also identify key values 346-1, 346-N from the data within the databases 342-1, 342-N. The key values 346-1, 346-N can include, but is not limited to: user identification of the event data, access card ID, time stamp, gate details, image information, log in times, log out times, among other values from the databases 342-1, 342-N that relates to a number of users.

That mapped data from the databases 342-1, 342-N can be sent to a barrier 348. The barrier 348 can be a processing device to process the key values 346-1, 346-N. The barrier 348 can be utilized to aggregate the key values 346-1, 346-N into a number of intermediate values. Aggregating the key values 346-1, 346-N can include combining similar values and/or quantifying similar values into a number of intermediate values. In some embodiments, the barrier 348 can aggregate the data from the databases 342-1, 342-N by determining a number of key value pairs. The number of key value pairs can include a first value from a first database 342-1 that represents a particular event and a second value from a second database 342-N that also represents the particular event.

The intermediate values from the barrier 348 can be sent to a reducing engine 350. The reducing engine 350 can collect the intermediate values for a particular user and/or group of users and determine a usage pattern for the particular user and/or group of users. The usage pattern for the particular user and/or group of users can include a number of closely related key values from the databases 342-1, 342-N and reducing the data set by eliminating outliers from the data. In some embodiments, the reducing engine 350 can be utilized to determine the outliers of the data and/or create the models after removing the outliers.

The reducing engine 350 can send the usage pattern for the particular user and/or group of users to a log file 352. The log file 352 can include a visualization file of the usage pattern. The visualization file for the usage pattern can include a scatter plot or plotted data that represents the usage pattern for the particular user. In some embodiments, the visualization file can include a heatmap representation of the combined data set. For example, the visualization file can include a heatmap representation of the combined data set for a number of users' access patterns. In some embodiments, the visulazation file can include a geographical representation of the combined data set to display usage patterns for a number of different geographical locations. For example, the visualization file can include a display of a geographical area (e.g., map of country, map of world, etc.) with a viasualization plot of the combined data set to display usage patterns for a number of different geographical locations within the geographical area. As described herein, the visualization file can include a linear regression representation model for a number of users over a period of time.

In addition, the visualization file can include a heat map representation of a particular user and/or a particular group of users over a particular period of time. In some embodiments, the visualization file can include a scatter plot representation of the combined data set for a number of different mathematical modeling outputs (e.g, nearest neighbors, linear support vector machine (SVM), radial basis function (RBF) SVM, decision tree, naive bayes, linear discriminant analysis (LDA), quadradic discriminant analysis (QDA), Random Forest, etc.). For example, the visualization file can include a first scatter plot of the combined data set with a nearest neighbor mathematical model and a second scatter plot of the combined data set with a decision tree mathematical model.

The system 340 can be advantageous over previous systems and methods by collecting data from different databases 342-1, 342-N, mapping the data from the different databases to particular users, identifying key values and key value pairs, and then generating a log file 352 from the key value pairs to represent a normal behavior and/or usage pattern for a particular user and/or group of users. In some embodiments, the system 340 can be implemented as a file system 216 as referenced in FIG. 2.

Figure 4:
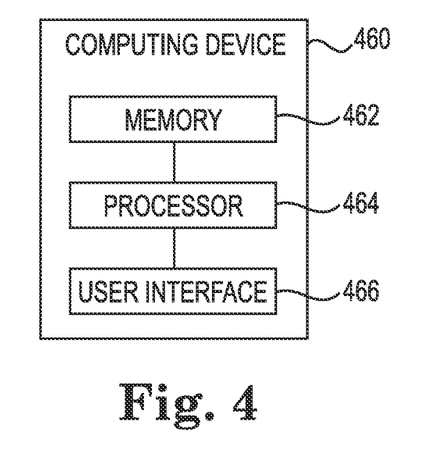
FIG. 4 is an example of a computing device for security log mining according to one or more embodiments of the present disclosure.

FIG. 4 is an example of a computing device 460 for security log mining according to one or more embodiments of the present disclosure. Computing device 460 can be, for example, a laptop computer, a desktop computer, a microprocessing resource, or a mobile device (e.g., a mobile phone, a personal digital assistant, etc.), among other types of computing devices. Computing device 460 can be utilized in systems 210 and/or 340 to perform the functions previously described herein.

As shown in FIG. 4, computing device 460 includes a memory 462 and a processing resource 464 (e.g., processor) coupled to memory 462. Memory 462 can be any type of storage medium that can be accessed by processing resource 464 to perform various examples of the present disclosure. For example, memory 462 can be a non-transitory computer readable medium having computer readable instructions (e.g., computer program instructions) stored thereon that are executable by processing resource 464 to perform security log mining in accordance with one or more embodiments of the present disclosure.

Memory 462 can be volatile or nonvolatile memory. Memory 462 can also be removable (e.g., portable) memory, or non-removable (e.g., internal) memory. For example, memory 462 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 462 is illustrated as being located in computing device 460, embodiments of the present disclosure are not so limited. For example, memory 462 can also be located internal to another computing resource (e.g., enabling computer readable instructions to be downloaded over the Internet or another wired or wireless connection).

As shown in FIG. 4, computing device 460 can also include a user interface 466. User interface 466 can include, for example, a display (e.g., a screen). The display can be, for instance, a touch-screen (e.g., the display can include touch-screen capabilities). User interface 466 (e.g., the display of user interface 466) can provide (e.g., display and/or present) information to a user of computing device 460.

Additionally, computing device 460 can receive information from the user of computing device 460 through an interaction with the user via user interface 466. For example, computing device 460 (e.g., the display of user interface 466) can receive input from the user via user interface 466. The user can enter the input into computing device 460 using, for instance, a mouse and/or keyboard associated with computing device 460, or by touching the display of user interface 466 in embodiments in which the display includes touch-screen capabilities (e.g., embodiments in which the display is a touch screen).

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An access control system for security log mining, comprising:
   a distributed file system configured to:
      receive structured data from a first database associated with system access events, wherein the structured data resides in a fixed field within a record of the system access events; and
      receive non-structured data from a second database associated with system access events, wherein the non-structured data resides in a non-fixed field within the record of the system access events;
   a data extractor configured to extract a number of features associated with the system access events of a number of users from the structured and non-structured data;
   a data fusion unit configured to combine the extracted number of features into a combined data set for each of the number of users; and
   an anomaly detection engine configured to:
      generate a model of behavior for each the number of users based on the combined data set by reducing the combined data set into a number of key value pairs that correspond to each of the number of users; and
      compare real time behavior for the number of users to the model for the number of users to determine whether the real time behavior for the number of users is anomalous behavior for the number of users.

2. The access control system of claim 1, wherein the anomaly detection engine is configured to generate a mathematical model for each of the extracted number of features.

3. The access control system of claim 1, wherein the anomaly detection engine is configured to generate a range of acceptable values for each of the extracted number of features.

4. The access control system of claim 1, wherein the anomaly detection engine is configured to, upon determining the real time behavior for the number of users is anomalous, determine a priority level for the determined anomalous behavior based on a value assigned to the anomalous behavior.

5. The access control system of claim 1, wherein the number of features include a physical location for a device of the system.

6. The access control system of claim 1, wherein the anomaly detection engine is configured to generate the model based at least in part on historical data for each of the number of users.

7. A method for security log mining, comprising:
   combining, using a data fusion unit of an access control system, features of structured and non-structured data associated with system access events for a number of users into a combined data set, wherein the structured data resides in a fixed field within a record of the system access events and wherein the non-structured data resides in a non-fixed field within the record of the system access events;
   generating, using an anomaly detection engine of the access control system, a model of behavior for the number of users based on the combined data set; and
   comparing, using the anomaly detection engine of the access control system, real time behavior for the number of users to the model for the number of users to determine whether the real time behavior for the number of users is anomalous behavior for the number of users.

8. The method of claim 7, wherein the method includes determining, using the anomaly detection engine, a range for the model, wherein the range includes acceptable behavior values and anomalous behavior values.

9. The method of claim 7, wherein combining structured and non-structured data includes combining, using the data fusion unit, physical log data and logical log data for the number of users.

10. The method of claim 7, wherein combining structured and non-structured data includes combining, using the data fusion unit, features of the structured and non-structured data with corresponding time stamp data.

11. The method of claim 7, wherein combining structured and non-structured data includes quantifying, using a data extractor of the access control system, subjective data from the structured and non-structured data via fuzzy fusion or Dempster-Shafer fusion techniques.

12. The method of claim 7, wherein combining structured and non-structured data includes:
  determining, using a data extractor of the access control system, a weighted value for the structured and non-structured data; and
  combining, using the data fusion unit, the structured and non-structured data based on the determined weighted values.

13. The method of claim 7, wherein combining structured and non-structured data includes:
  extracting, using a data extractor of the access control system, a number of features of the structured data;
  extracting, using a data extractor of the access control system, a number of features of the non-structured data;
  categorizing, using a clustering unit of the access control system, the number of features of the structured and non-structured data;
  defining, using the clustering unit, a relationship for the structured and non-structured data based in part on historical behavior;
  providing, using the data fusion unit, a membership function to the structured and non-structured data based in part on historical behavior; and
  fusing, using the data fusion unit, the structured and non-structured data.

14. The method of claim 7, wherein the method includes:
  extracting, using a data extractor of the access control system, profile data for the number of users; and
  combining, using the data fusion unit, the profile data for the number of users with corresponding data from the combined data set.

15. The method of claim 7, wherein generating the model of behavior for the number of users includes generating, using the anomaly detection engine, a separate model of behavior for each of the number of users.

16. The method of claim 15, wherein generating a separate model of behavior for the number of users includes generating, using the anomaly detection engine, a separate model of behavior that includes key value pairs for each respective user.

17. A non-transitory computer readable medium, comprising instructions executable by a processing resource to:
  receive structured data from a first database associated with system access events, wherein the structured data resides in a fixed field within a record of the system access events;
  receive non-structured data from a second database associated with system access events, wherein the non-structured data resides in a non-fixed field within the record of the system access events;
  combine the structured and non-structured data for a number of users into a combined data set;
  generate a model of behavior for the number of users based on the combined data set by reducing the combined data set into a number of key value pairs that correspond to each of the number of users; and
  compare real time behavior for the number of users to the model for the number of users to determine whether the real time behavior for the number of users is anomalous behavior for the number of users.

18. The medium of claim 17, wherein the structured data includes: system usage data and system access logs.

19. The medium of claim 17, wherein the non-structured data includes video logs and communication data.

20. The medium of claim 17, wherein the instructions to combine the structured and non-structured data includes instructions to combine, via offline batch processing, key value pairs that correspond to each of the number of users.

* * * * *